9004X
J. Turner,
Corn Sheller.
Patented Aug 15. 1835.
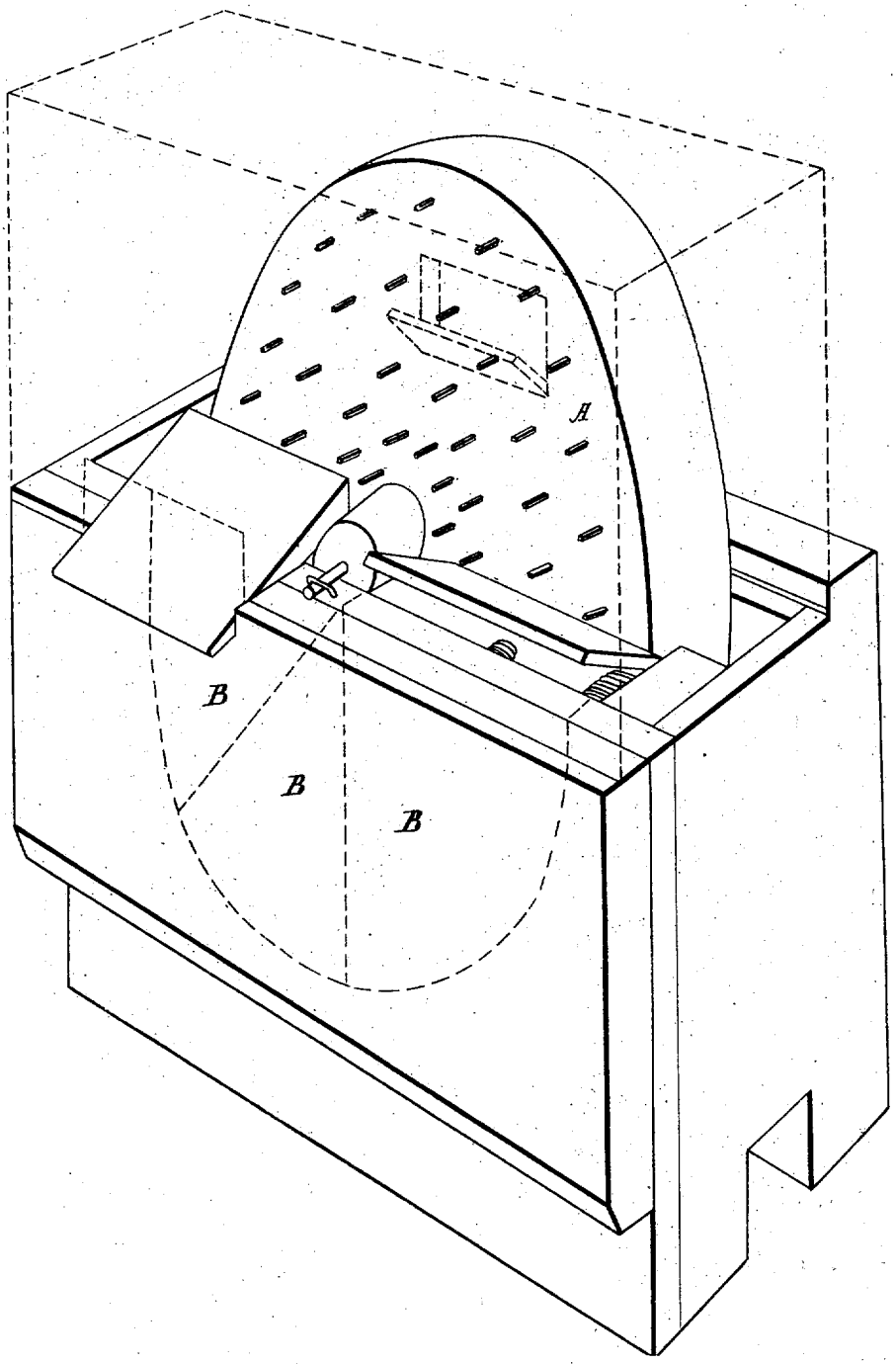

Joseph Turner Poland Maine

Letters Patent

The Schedule referred to in these Letters Patent and making part of the same containing
a description in the words of the said Joseph Turner himself of his improvement in
a machine called a Corn Sheller.

To all to whom these presents shall come: Be it known that I Joseph Turner of Poland
in the county of Cumberland and State of Maine have invented a new and useful
improvement in a machine for separating the corn from the cob called the Corn Sheller, and
that the following is a full and exact description of the construction and opera-
tion of said machine as invented or improved by me.

The box or body of the machine
is three feet eight inches long eighteen inches wide and two feet and six inches
high. This box is formed of hard wood plank one inch and a half in thickness
and fastened by screws to hard wood posts two feet & a half long and four
inches square in the corners. On one side of this box there is an open space
of eight inches high extending the whole length of the box. On the same side of
the box there is fitted to the posts in the corners a bar of hard wood by tenon
or dovetail one inch and a half in thickness and three inches deep in such
a manner as to leave a space one and a half inch between said bar and
the side of the box. This bar comes up to the top of the box.

On this bar and the op-
posite side of the box and exactly in the middle of the box there is put [illegible]
boxes. On these boxes there works upon a gudgeon of iron made of an iron bar one
inch square a heavy wheel three feet in diameter and three inches thick as by
letter A in the annexed drawing. On one side of this wheel there are inserted
in circular rows of iron spikes two inches long three eighths of an inch square
and projecting from the surface of the wheel five eighths of an inch. These spikes
are thus placed from three fourths to one inch apart. The wheel is set as near
the bar before described as possible, on the end of the Gudgeon and in the space
between the bar and the side of the box there is fastened a small cog wheel of cast iron or [illegible] three inches in diameter. Another cog wheel one foot in
diameter is attached to a shaft with a crank and so fitted as to mesh into the
small cog wheel and by turning the crank to give a rapid motion to the wheel
The large wheel is also made of cast iron and the shaft to which it is attached
revolves in lead boxes. These gudgeons are bound down by iron binders.

On the opposite side and on the inside of the box there is fitted a
follower in the form of a semi circle corresponding in size to one half of the wheel
before described. This follower is made of hard wood one inch and a half in thick-
ness and divided into three parts as indicated by the dotted lines in the annex-
ed plan (3)(3)(3). The edges where these pieces meet are graduated one half inch the
three pieces called the follower there are similar rows of iron teeth so placed as to in-
=terlock with those in the wheel. In each of these pieces there are inserted three
pins of strong wood one inch in diameter all of which pass loosely through the side
of the box retaining the follower. When pushed forward towards the wheel to its
furthest extent in a position so that the space between it and the wheel will
be one inch and a quarter. It is thus prevented from approaching nearer
by means of a head to the pins thus described. A spiral spring is placed round
each of these pins pushing forward the follower to the greatest extent. These springs
are made of wire three sixteenths of one inch in diameter. A piece of plank
four inches in thickness is so constructed as to fit to the follower and prevent
the ear from falling down. A box twenty inches high of the same length of the
other & thirteen inches wide made of pine boards one inch in thickness &
dovetailed together at the sides and ends. [illegible] covered & nailed at the
top and open at the bottom is then fastened to the lower box by means
of hasps at each end this box prevents the corn from scattering. A feeder
formed by cutting a hole through the side of the upper box in a position
just half way between the centre and the right hand end of the box one
foot long and eight inches wide standing diagonally downwards in the
inner part of which there is a slide on which the ears of corn are placed
and dropped down when the machine is in motion as will appear by the
letter C. Another slide on the opposite end formed partly by cutting the upper
and partly by cutting the lower box inclining outward sixteen inches
long and eight inches wide receives the cobs and brings them out of the

900114 X machine separate from the corn. This machine can be worked by hand or by horse power with the application of machinery and the corn is dropped down the pan horizontally as fast as a man can pick it up and drop it to the feeder one ear at a time I claim as my invention in the foregoing the followers made of three distinct pieces and the application of the spiral springs to the followers as now applied together with the [illegible] separating the cob from the corn & the upper box preventing the corn from scattering Witnesses Joseph W. Prentiss Freeman Bradford Joseph Turner Ex. [illegible]

C.J.W.

(Drawing)

1035 n.d.